United States Patent

Meyn

[11] 4,074,390
[45] Feb. 21, 1978

[54] FOWL GIZZARD SEPARATOR
[76] Inventor: Pieter Meyn, Noordeinde 72, Oostzaan, Netherlands
[21] Appl. No.: 662,205
[22] Filed: Feb. 27, 1976
[51] Int. Cl.$^2$ ............................................. A22C 21/00
[52] U.S. Cl. ......................................... 17/11; 17/43
[58] Field of Search ........................ 17/43, 11, 58, 45
[56] References Cited
U.S. PATENT DOCUMENTS

| | | | |
|---|---|---|---|
| 2,846,716 | 8/1958 | Danielsson | 17/58 |
| 3,406,425 | 10/1968 | Hill | 17/11 |
| 3,480,991 | 12/1969 | Edwards, Sr. | 17/11 |
| 3,579,714 | 5/1971 | Edwards, Sr. | 17/11 |
| 3,724,029 | 4/1973 | Lewis | 17/11 |

Primary Examiner—Robert Peshock
Attorney, Agent, or Firm—Haseltine, Lake & Waters

[57] ABSTRACT

Apparatus for separating the gizzard from a package of interconnected entrails removed from a fowl, comprising a horizontal rotating transport drum with helical external ribs, cooperating with a stationary sloping support blade in moving the gizzard towards a cutting assembly attached to the frame, while supporting the gizzard on the support blade, whereas the remaining entrails connected to the gizzard dangle below the support blade. The cutting assembly comprises a rotating circular knife cooperating with a stationary counter knife having a groove, into which the cutting edge of the rotating knife extends, for separating the gizzard from the remaining entrails dangling therefrom. The rotating knife is resiliently urged towards the counter knife.

7 Claims, 2 Drawing Figures

4,074,390

FOWL GIZZARD SEPARATOR

FIELD OF THE INVENTION

The invention relates to an apparatus for separating the gizzard from a package of interconnected entrails removed from a fowl or the like.

BACKGROUND

In most slaughter-houses automatic machines are used which remove the entrails from the fowl as a whole. Not all of the entrails are unfit for consumption and in most cases the liver, the heart and the gizzard are separated from the entrails. The entrails are interconnected, so that they form a package, from which the liver, the heart and the gizzard are separated by hand. This of course is a tiresome job and also time consuming.

SUMMARY OF THE INVENTION

The invention therefore has as its principal object to provide an apparatus for automatically separating the gizzard from the package of interconnected entrails removed from a fowl.

According to the invention this object is obtained by an apparatus comprising a frame, cutting means mounted within said frame, supporting means mounted within said frame for supporting a gizzard while leaving the remaining entrails of said package dangling therefrom, transport means connected with said frame for moving said gizzard towards said cutting means, and driving means operationally connected with said transport means and supported by said frame, said transport means cooperating with said cutting means in such manner that said remaining entrails are cut free from said gizzard by said cutting means.

Advantageously, said transport means comprises a drum mounted within said frame for rotation about a substantially horizontal axis and rotated by said driving means, said drum being provided with external helical ribs extending radially from said drum. Preferably, the supporting means comprises a sloping blade positioned alongside said drum and closely spaced from said ribs in such manner that said remaining entrails are allowed to drop down between said blade and said drum, whereas the gizzard is pushed along said blade by said helical ribs towards said cutting means.

The cutting means comprises a subframe connected to said frame supporting a rotatably mounted circular knife and carrying a driving means for rotating said knife. Preferably, the cutting means further comprises a stationary counter knife carried by said frame, said counter knife having a generally V-shaped groove into which the circumferential cutting edge of said circular knife partially protrudes. Advantageously, the subframe is pivotably connected to said frame about an axis including an angle with the vertical, said frame being provided with an adjustable abutment means against which said subframe is urged by the force of gravity, so that the spacing between the outer edge of said circular knife and the bottom of said V-shaped groove of said counter knife may be adjusted by means of said adjustable abutment means.

BRIEF DESCRIPTION OF THE DRAWING

Further features and advantages of the invention will become apparent from the detailed description of the embodiment of the invention taken in connection with the accompanying drawing, wherein.

DETAILED DESCRIPTION OF THE PREFERRED EMBODIMENT

Figure 1:
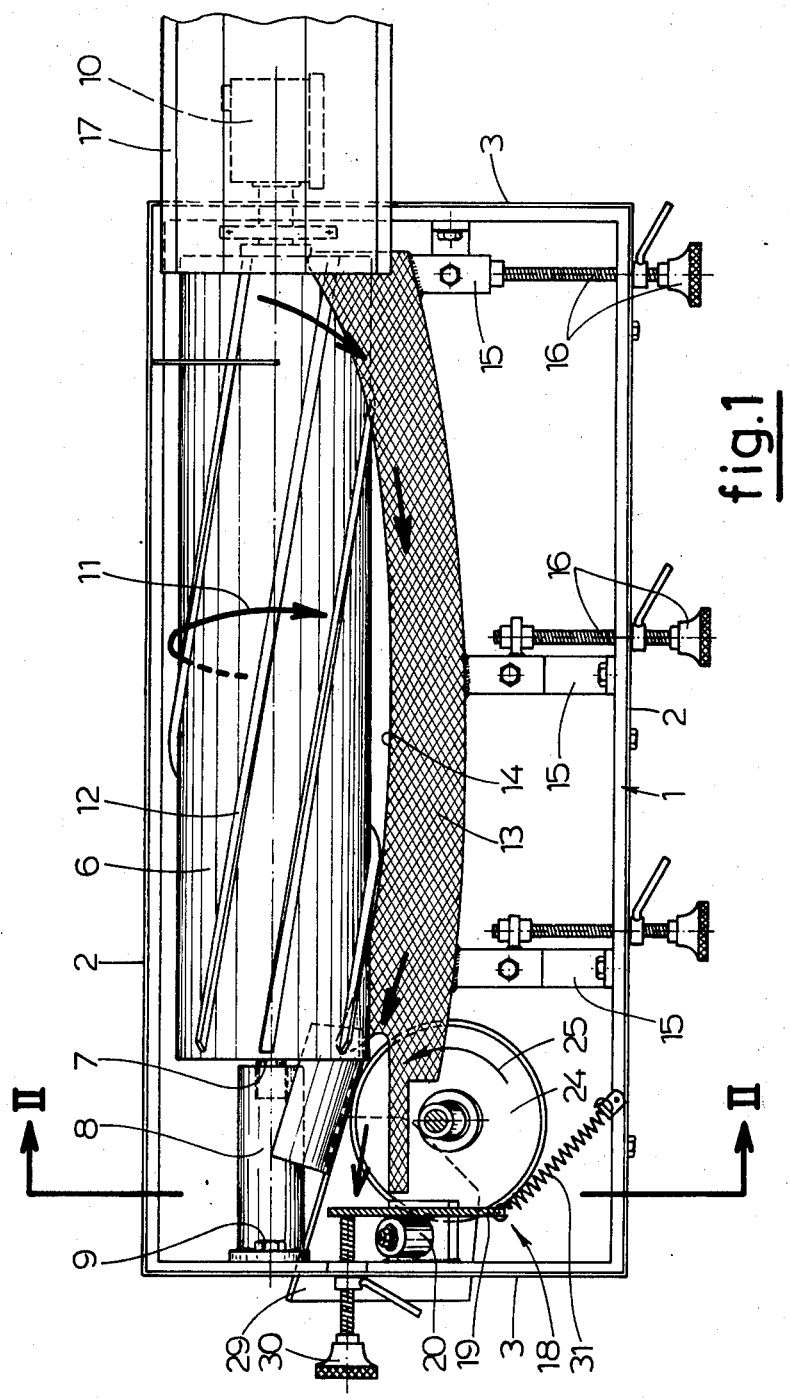
FIG. 1 is a top view of an apparatus according to the invention.

The apparatus according to the invention, of which a preferred embodiment is shown in the drawings, serves for automatically separating the gizzard from the package of interconnected entrails removed from a fowl.

The apparatus comprises a rectangular box-like frame 1 with sidewalls 2 and endwalls 3. The vertical posts 4 are provided at the lower end with flanged feet 5 by means of which the frame 1 may be attached to a floor or working platform.

An elongated drum 6 is mounted for rotation about a substantially horizontal axis within the frame 1. The forward end of a central shaft 7 of the drum 6 is supported by a bearing 8, the end of which is attached to the forward endwall 3 by means of bolt 9. The other end of the central shaft 7 is connected to a motor 10, only schematically shown in FIG. 1 for rotating the drum 6 in the direction as shown by arrow 11 in FIG. 1. The drum 6 carries a number of radially extending parallel, external helical ribs 12, the function of which will be explained later in detail.

Figure 2:
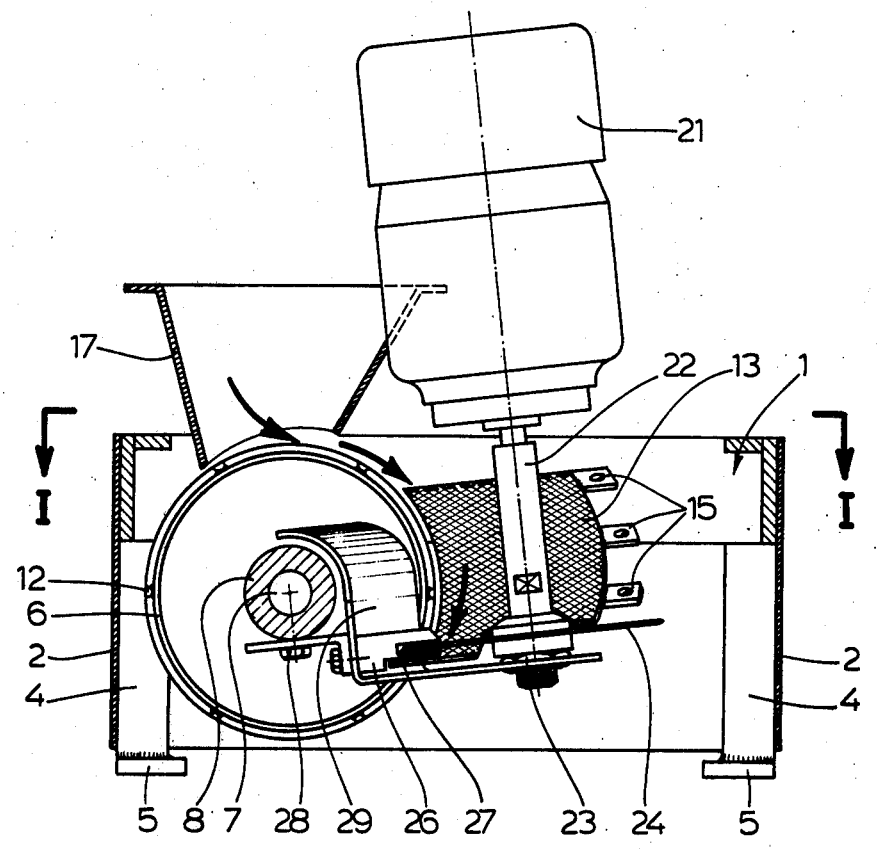
FIG. 2 is a cross-sectional view taken along line II—II in FIG. 1.

A curved supporting blade 13 is mounted adjacent said drum with its inner edge 14 very closely spaced from the external ribs 12 of the drum 6. As is best seen in FIG. 2, the blade 13 slopes down from the rear endwall 3 towards the front endwall of the apparatus, in such manner that the upper end of the blade lies above the central shaft 7 of the drum 6 whereas the lower end of the blade 13 lies below the level of the shaft 7. The blade 13 is supported by a number of adjustable links 15 connected between the outer edge of the blade 13 and the opposite sidewall 2 of the apparatus. In this manner, the position of the blade 13 relative to the drum 6 and the ribs 12 thereof may be adjusted by means of adjustment screws 16 as shown in FIG. 1.

At the upper end of the blade 13 a chute 17 is mounted on the frame 1 by means of which the entrails are delivered to the apparatus.

At the forward end of the blade 13, a cutting assembly 18 is mounted within the frame 1. The cutting assembly comprises a subframe 19 pivotably connected with the front edge of the frame 1 by means of a hinge 20. The axis of the hinge 20 forms an acute angle with the vertical.

Attached to the subframe 19 is a motor 21, the driving shaft 22 of which is parallel to the axis of the hinge 20 as is most clearly indicated in FIG. 2. Attached to the lower free end of the driving shaft 22 by means of a nut 23 is a circular knife 24 rotated by the motor 21 in the direction shown by arrow 25 in FIG. 1.

The cutting assembly 18 further comprises a stationary counter knife 26 attached to the bearing 8 and thus to the frame 1. The counter knife 26 is provided with a groove 27 and the cutting edge of the rotating circular knife 24 extends into the groove 27.

The counter knife is attached to the bearing 8 by means of a screw and further carries a chute 29, which constitutes an outlet chute for removing the separated gizzards from the apparatus as will be explained in detail hereafter.

Because the axis of the hinge 20 is not vertical the cutting edge of the circular knife 24 will be urged towards the counter knife 26 by the weight of the motor 21 and the subframe 19. The subframe 19 abuts against the free end of an adjustment screw 30 carried by the front wall 3 of the apparatus by means of which the spacing between the knife 24 and the counter knife 26 may be adjusted.

In operation the entrails from which the liver has previously been removed, are delivered by the chute 17 from which they drop onto the rotating drum 6. Because of the rotation of the drum 6 the entrails will be moved towards the supporting blade 13. The spacing between the inner edge 14 of the blade 13 and the drum 6 is such, that the gizzards cannot pass between the blade and the drum. The remaining entrails connected to the gizzards, however, will pass between the blade and the drum, so that they will remain dangling from the gizzards retained by the blade 13. The gizzards supported by the blade 13 will be moved along the blade towards its lower end by the ribs 12 of the drum 6. When they reach the cutting assembly 18 the connection between the gizzards and the remaining enttrails is severed by the knife 24. The separated gizzards will be removed from the apparatus by means of the outlet chute 29, whereas the remaining entrails drop down into a bin or onto a conveyor for removing them from the apparatus (not shown). The gizzards may be delivered into an other container or onto another conveyor (also not shown).

An important feature of the apparatus according to the invention is the fact that the knife 24 is urged into the groove 27 of the counter knife 26. In this manner the apparatus is prevented from becoming clogged. Clogging of the aparatus is avoided because the knife 24 can be pushed away against the force of gravity, from the counter knife by the pressure of the gizzards delivered to the cutting assembly after which the gizzards can pass the knife and thus will not block the apparatus. The knife will then automatically be moved back to its original position adjusted by means of the abutment screw 30. This movement of the knife will take place under the influence of the force of gravity, but if necessary may be supplemented by a helical spring 31 attached between the subframe 19 and the frame 1.

It will be clear that the apparatus described in the foregoing is merely an embodiment of the invention by way of example. Within the scope of the invention several possible changes will occur to those skilled in the art. The driving motor 10 for instance could be contained within the drum 6 itself. Although in the embodiment shown the drum 6 and the rotating knife 24 are driven by electric power, they could of course be driven in any other suitable way. The apparatus may be provided with a removable top cover, although such a cover is not shown in the drawings.

What is claimed is:

1. Apparatus for separating the gizzard from a package of interconnected entrails removed from a fowl or the like, comprising a frame;
   cutting means mounted within said frame;
   supporting means mounted within said frame for supporting a gizzard while leaving the remaining entrails of said package dangling therefrom;
   transport means connected with said frame for moving said gizzard towards said cutting means while said remaining entrails dangle from the supporting means; and
   driving means operationally connected with said transport means and supported by said frame, said transport means cooperating with said cutting means in such manner that said remaining entrails are cut free from said gizzard by said cutting means.

2. Apparatus according to claim 1, wherein said transport means comprises a single drum mounted within said frame for rotation about a substantially horizontal axis and rotated by said driving means, said drum being provided with external helical ribs extending radially from said drum for pushing a gizzard along said supporting means towards said cutting means.

3. Apparatus according to claim 2, wherein said supporting means comprises a sloping blade positioned alongside said drum and closely spaced from said ribs in such manner that said remaining entrails are allowed to drop down between said blade and said drum, whereas the gizzard is pushed along said blade by said helical ribs towards said cutting means.

4. Apparatus according to claim 1, wherein said cutting means comprises a subframe connected to said frame, a rotatably mounted circular knife on said subframe and a driving means for rotating said knife.

5. Apparatus according to claim 4, wherein said cutting means further comprises a stationary counter knife caried by said frame, said counter knife having a generally V-shaped groove into which the circumferential cutting edge of said circular knife partially protudes.

6. Apparatus according to claim 5, wherein said subframe is pivotably connected to said frame about an axis forming an angle with the vertical, said frame being provide with an adjustable abutment means against which said subframe is urged by the force of gravity, so that the spacing between the outer edge of said circular knife and the bottom of said V-shaped groove of said counter knife may be adjusted by means of said adjustable abutment means.

7. Apparatus to claim 1, wherein said cutting means comprises a circular cutting blade positioned with respect to the supporting means to sever the dangling entrails from the gizzard on the supporting means.

* * * * *